US012768750B2

(12) United States Patent
Stehlik

(10) Patent No.: US 12,768,750 B2
(45) Date of Patent: Oct. 20, 2026

(54) FUEL AND OIL LEAK DETECTION SYSTEM

(71) Applicant: RTX Corporation, Farmington, CT (US)

(72) Inventor: Eric G. Stehlik, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 289 days.

(21) Appl. No.: 18/583,591

(22) Filed: Feb. 21, 2024

(65) Prior Publication Data

US 2025/0264375 A1 Aug. 21, 2025

(51) Int. Cl.
*G01M 15/02* (2006.01)
*G01M 3/04* (2006.01)

(52) U.S. Cl.
CPC ............ *G01M 15/02* (2013.01); *G01M 3/045* (2013.01)

(58) Field of Classification Search
CPC ....... G01M 3/025; G01M 3/042; G01M 15/02
See application file for complete search history.

(56) References Cited

U.S. PATENT DOCUMENTS

| | | | | |
|---|---|---|---|---|
| 4,823,116 | A | 4/1989 | Kitchen, III et al. | |
| 4,922,232 | A * | 5/1990 | Bosich | G01M 3/045 200/61.04 |
| 5,200,615 | A * | 4/1993 | Hopenfeld | G01M 3/38 250/227.21 |
| 5,282,546 | A * | 2/1994 | Bauer | B65D 90/022 220/567.2 |
| 6,363,919 | B1 | 4/2002 | Isobe et al. | |
| 10,989,620 | B2 | 4/2021 | Saha et al. | |
| 2014/0010712 | A1 | 1/2014 | Heerah et al. | |
| 2020/0173366 | A1 | 6/2020 | Akana et al. | |
| 2020/0248580 | A1 | 8/2020 | Scarborough et al. | |
| 2024/0077174 | A1* | 3/2024 | Lagarejo Lloreda | G01M 3/3263 |

OTHER PUBLICATIONS

European Search Report dated Jul. 3, 2025, in connection with European Application No. 25158122.9, 8 pages.

* cited by examiner

*Primary Examiner* — Erika J. Villaluna

(57) ABSTRACT

A system includes a housing. The system also includes a membrane disposed within the housing and configured to separate the housing into a lower area and an upper area, the membrane formed of a material that dissolves when exposed to a flammable liquid. The system further includes at least one sensor disposed within the lower area of the housing, the sensor configured to detect a presence of a liquid collected in a pool area corresponding to a bottom surface inside the housing.

18 Claims, 10 Drawing Sheets

FUEL AND OIL LEAK DETECTION SYSTEM

TECHNICAL FIELD

This disclosure relates generally to leak detection systems. More specifically, this disclosure relates to a fuel and oil leak detection system.

BACKGROUND

While in operation, engines can leak oil or fuel. For an aviation engine, this can lead to a potentially flammable environment. Currently, systems that detect the leakage of flammable liquids while the engine is in operation typically operate by checking liquid consumption levels. This poses a concern for slow leaks, as such leaks can be misconstrued as simply slightly higher consumption while the flammable liquid pools.

SUMMARY

This disclosure provides a fuel and oil leak detection system.

In a first embodiment, a system includes a housing. The system also includes a membrane disposed within the housing and configured to separate the housing into a lower area and an upper area, the membrane formed of a material that dissolves when exposed to a flammable liquid. The system further includes at least one sensor disposed within the lower area of the housing, the sensor configured to detect a presence of a liquid collected in a pool area corresponding to a bottom surface inside the housing.

In a second embodiment, a system includes an aircraft engine and one or more leak detection systems disposed on, in, or adjacent to the aircraft engine. Each of the one or more leak detection systems includes a housing. Each leak detection systems also includes a membrane disposed within the housing and configured to separate the housing into a lower area and an upper area, the membrane formed of a material that dissolves when exposed to a flammable liquid. Each leak detection systems further includes at least one sensor disposed within the lower area of the housing, the sensor configured to detect a presence of a liquid collected in a pool area corresponding to a bottom surface inside the housing.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, engines can leak oil or fuel while in operation. For an aviation engine, this can lead to a potentially flammable environment. Currently, systems that detect the leakage of flammable liquids while the engine is in operation typically operate by checking liquid consumption levels. This poses a concern for slow leaks, as such leaks can be misconstrued as simply slightly higher consumption while the flammable liquid pools.

This disclosure provides a fuel and oil leak detection system for use with an aviation engine. As described in greater detail below, the disclosed leak detection system can detect a leak of a flammable liquid, such as fuel, before the liquid collects in a quantity large enough to become a hazard. Note that while this disclosure is described with respect to aviation vehicle engines, it will be understood that the principles disclosed here are also applicable to other types of devices or environments.

Figure 1:
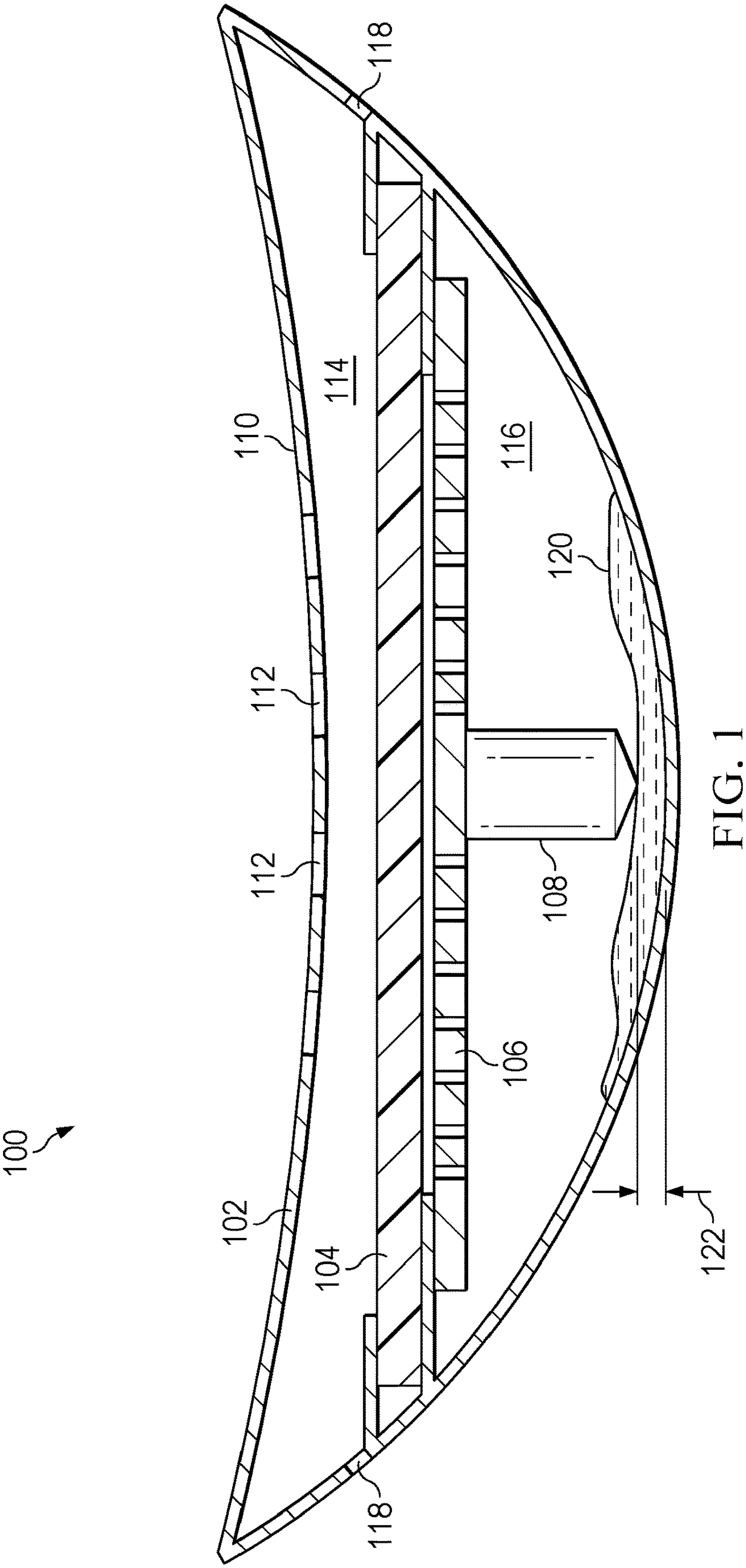
FIG. 1 illustrates an example fuel and oil leak detection system for use with an aviation engine according to this disclosure.

FIG. 1 illustrates an example fuel and oil leak detection system 100 for use with an aviation engine according to this disclosure. As shown in FIG. 1, the system 100 is shown in a vertical cross-sectional view, and includes a housing 102, a membrane 104, a bracket 106, and at least one sensor 108.

The housing 102 can represent, or be disposed in, a lower portion of an aircraft engine case. In other embodiments, the housing 102 can be a portion of a self-contained leak detection structure that is attached or affixed to (or within) the aircraft engine case. For example, the housing 102 can be attached to one or more fuel or oil lines that form a part of the aircraft engine case. In other embodiments, the housing 102 can be integrated into other structural elements of the aircraft engine. As shown in FIG. 1, the housing 102 can include a concave upper wall 110 that includes one or more input holes 112 passing through the upper wall 110. The input holes 112 are positioned at or near the low point of the upper wall 110 (as measured in the vertical direction) and above the membrane 104. If a liquid (such as fuel, oil, water, or the like) leaks onto the top surface of the upper wall 110, the liquid will tend to flow towards the input holes 112, and then down through the input holes 112 into the interior portion of the housing 102, where the liquid will land on a top surface of the membrane 104.

The membrane 104 is a solid planar membrane that extends horizontally and completely across the interior of the housing 102, thereby dividing the housing 102 into an upper area 114 and a lower area 116. The membrane 104 is formed of polystyrene, polypropylene, or another polymer that is soluble in certain petroleum based liquids, such as fuel. In operation, if a non-flammable liquid (such as atmospheric water) leaks into the upper area 114 of the housing 102 through the input holes 112, the liquid will tend to accumulate on the top surface of the membrane 104, which is impenetrable to such a liquid. If enough liquid is present on the top surface of the membrane 104, the liquid will flow out of the housing 102 through one or more exit holes 118 in side walls of the housing 102.

However, if a flammable liquid, such as fuel or oil, leaks through the input holes 112 and lands on the top surface of the membrane 104, the flammable liquid will dissolve a portion of the membrane 104, resulting in one or more holes formed through the membrane 104. The flammable liquid passes through the formed hole(s) into the lower area 116 of the housing 102 and collecting in a pool area 120 on a bottom inner surface of the housing 102. In other words, the membrane 104 is selectively penetrable-impervious to non-flammable liquids and dissolvable by flammable liquids. In some embodiments, the membrane 104 is configured to be easily installed in, or removed from, the housing 102. For example, the membrane 104 may be slidably installable along rails disposed on sides of the housing 102. This is useful because, once the membrane 104 has been penetrated by a flammable liquid, the resulting hole(s) would later allow a non-flammable liquid to pass through. Thus, the membrane 104 may need to be easily replaceable.

The bracket 106 is provided to hold the sensor 108 in a fixed position within the lower area 116 of the housing 102. In some embodiments, the bracket 106 is a horizontally oriented plate to which the sensor 108 is attached. In some embodiments, the bracket 106 is porous or otherwise contains openings such that any liquid that passes through the membrane 104 will also pass through the bracket 106. This allows the liquid to descend all the way to the pool area 120.

The sensor 108 can be a liquid detection probe that is capable of detecting the presence of a liquid (such as fuel, oil, water, or the like) that may have collected in the pool area 120 of the housing 102. As shown in FIG. 1, the sensor 108 can be installed such that there is a small threshold space 122 between the sensing element of the sensor 108 and the bottom inner surface of the housing 102. This threshold space 122 allows a predetermined amount of liquid to collect within the pool area 120 before the sensor 108 senses the presence of the liquid. This can be useful in environments in which the presence of a small amount of liquid is acceptable. In some embodiments, the sensing element of the sensor 108 may be in contact with the bottom surface of the housing such that the threshold space 122 is zero. This can be helpful in environments where it is desirable for the sensor 108 to detect any liquid at the bottom of the housing 102.

Figure 2:
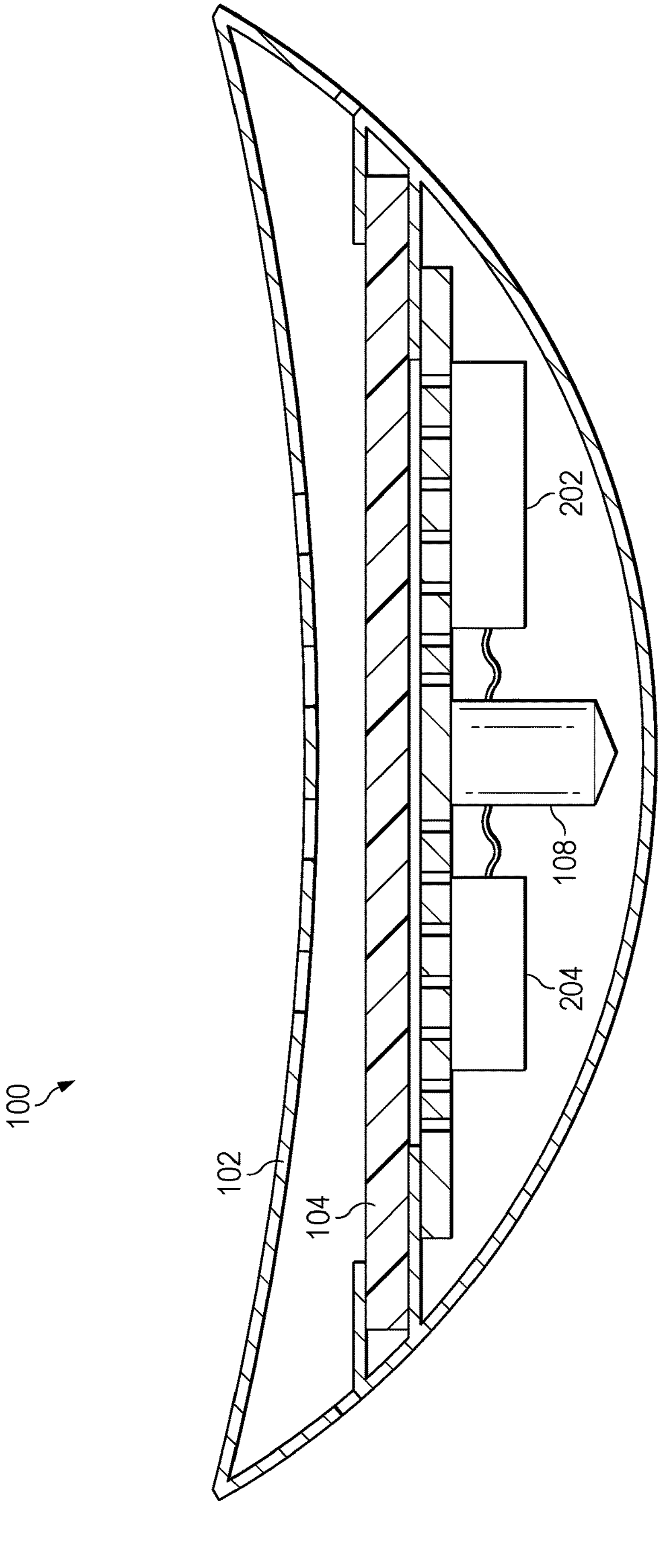
FIGS. 2 and 3 illustrate other embodiments of the system of FIG. 1 according to this disclosure.

FIG. 2 illustrates another embodiment of the system 100 according to this disclosure. As shown in FIG. 2, the system 100 includes a power source 202 for powering the sensor 108. In some embodiments, the power source 202 can be a battery. In other embodiments, the power source 202 can be a Peltier plate that generates a current when the plate is exposed to both hot air surrounding the hot engine and cool air on a lower side of the housing 102. When opposite sides of a Peltier plate are exposed to a different temperatures with a large differential, a current can be generated in the Peltier plate. This current can then be provided from the power source 202 to the sensor 108 for powering the sensor 108. In some embodiments, the sensor 108 is coupled to the power source 202 via one or more wires that can be insulated to avoid exposing any flammable liquids to a spark.

The system 100 can also include a wired or wireless transmitter 204 coupled to the sensor 108. The transmitter 204 is provided to enable unidirectional or bidirectional communication between the sensor 108 and another device, such as a cockpit controller or monitor, a ground-based monitoring device, an engine computer, or any combination of these. For example, sensor readings indicating the presence of liquid in the pool area 120 can be transmitted from the sensor 108 to the cockpit via the transmitter 204. In some embodiments, the sensor 108 is coupled to the transmitter 204 via one or more wires that can be insulated to avoid exposing any flammable liquids to a spark.

In some embodiments, the power source 202, the transmitter 204, or both can be located outside of the housing 102. In such embodiments, one or more wires can extend from the sensor 108 inside the housing 102 to the external power source 202 and/or the transmitter 204.

Figure 3:
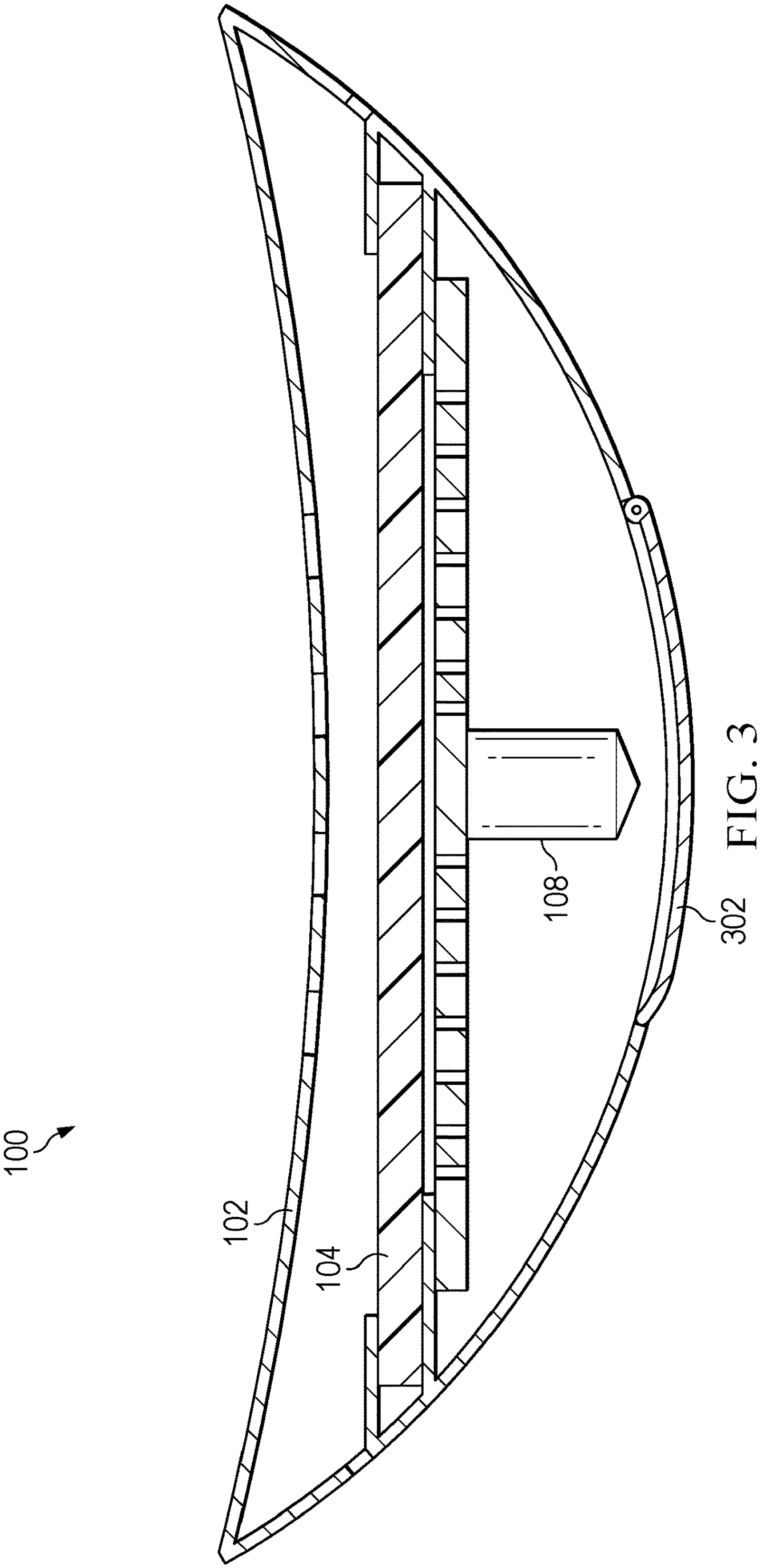

FIG. 3 illustrates another embodiment of the system 100 according to this disclosure. As shown in FIG. 3, the system 100 is installed in an aircraft nacelle that houses an engine. In this embodiment, the system 100 includes a door 302 disposed on a bottom wall of the housing 102, such as the bottom of the nacelle. The door 302 is provided to allow access to the interior portion of the housing 102 in order to release and/or inspect any trapped liquid that may have accumulated in the pool area 120 of the housing 102. The door 302 can also provide access to replace the membrane 104 or any other worn or faulty components within the housing 102. In some embodiments, the door 302 can be hinged on one side. In some embodiments, the door 302 can be lockable. While FIG. 3 shows a single door 302 at the bottom of the housing 102, this is merely one example. Other numbers of doors in other locations around the housing 102 are possible and within the scope of this disclosure. Also, while not specifically shown, one or more doors 302 could be included in any of the embodiments described in this disclosure.

Figure 4:
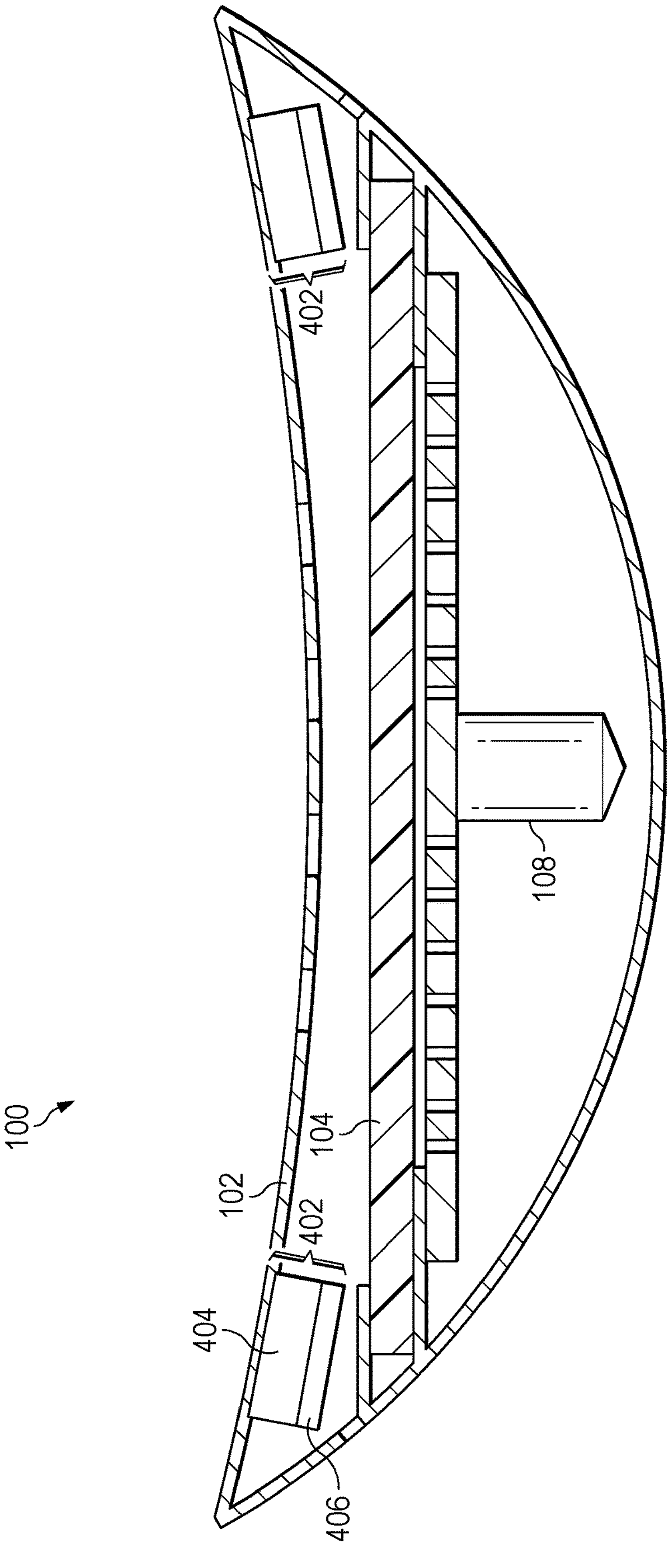
FIG. 4 illustrates the system of FIG. 1 with one or more fire suppression packs according to this disclosure.

In some embodiments, the system 100 can include one or more fire suppression components to discourage or prevent a fire from igniting within the housing 102. For example, FIG. 4 illustrates the system 100 with one or more fire suppression packs according to this disclosure. As shown in FIG. 4, the housing 102 includes two fire suppression packs 402 disposed inside the housing 102 on opposite ends. Each fire suppression pack 402 includes a fire suppression fluid 404 disposed within, and a temperature-sensitive trigger 406. The trigger 406 could be, for example, a mercury/alcohol/glycerin-based switch. In operation, if something (such as a leaked flammable liquid) ignites inside the housing 102, the temperature will rise inside the housing, causing the trigger 406 to melt or burst, thereby releasing the fire suppression fluid 404 within the housing 102.

Figure 5:
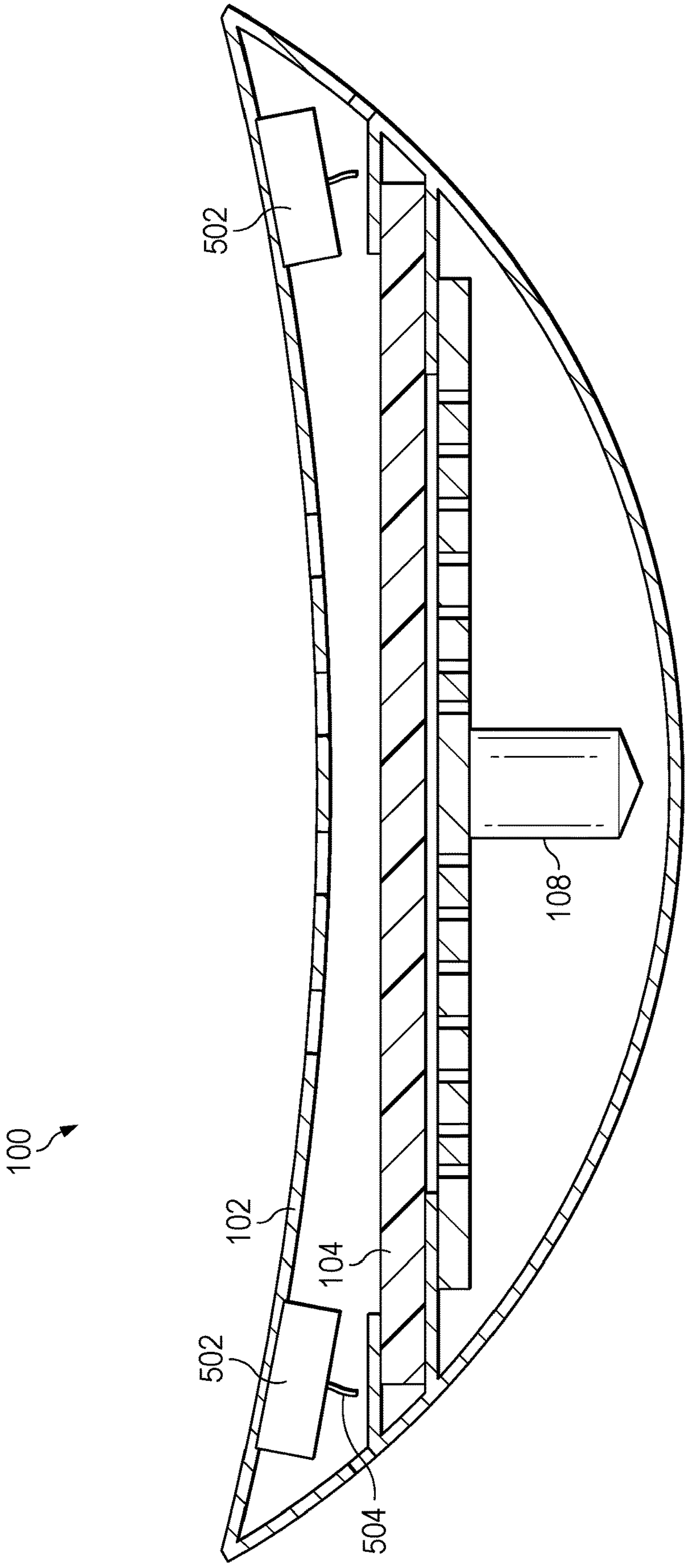
FIGS. 5 and 6 illustrate the system of FIG. 1 with one or more other fire suppression packs according to this disclosure.
Figure 6:
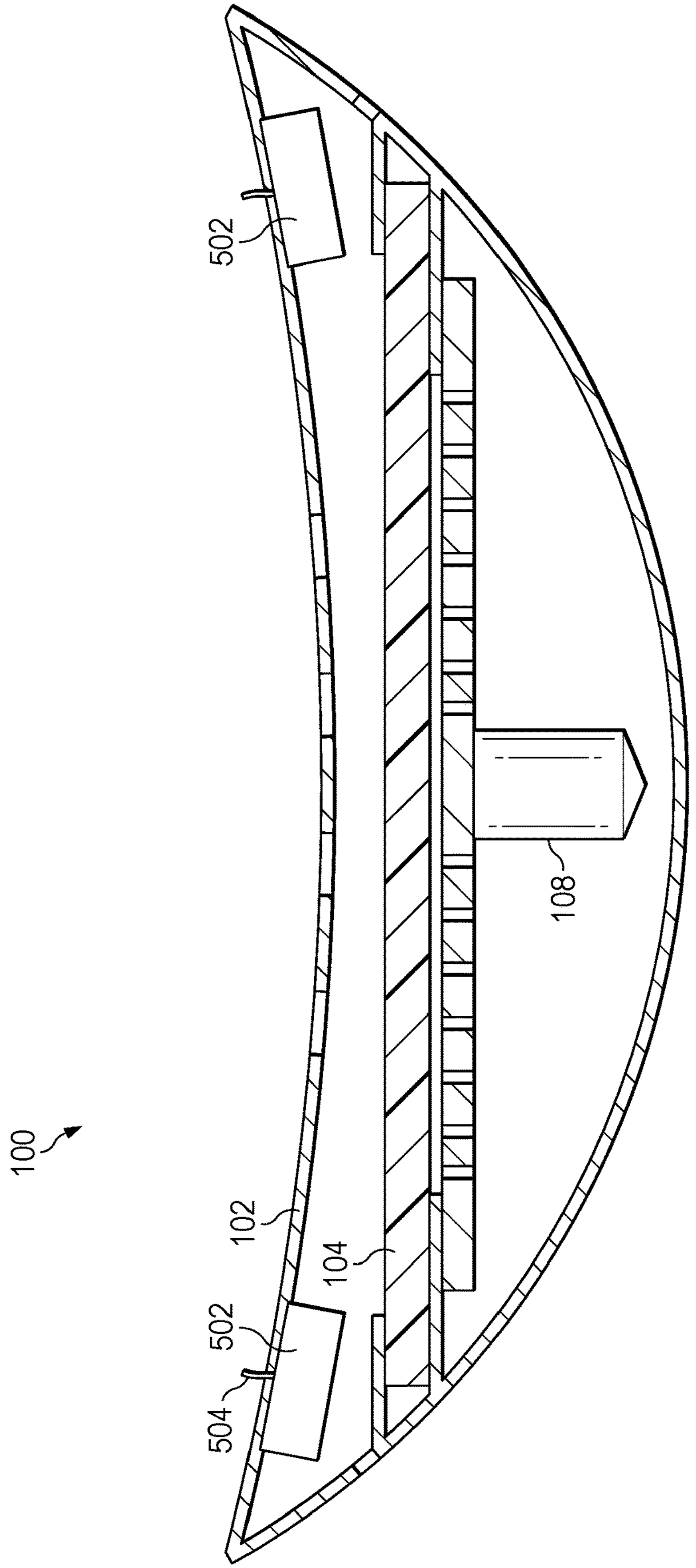

As another example, FIGS. 5 and 6 illustrate the system 100 with one or more other fire suppression packs according to this disclosure. As shown in FIG. 5, the housing 102 includes two fire suppression packs 502 disposed inside the housing on opposite ends. Each fire suppression pack 502 includes a fuse 504 and a fire suppression fluid disposed within the fire suppression pack 502. In operation, if a fire occurs inside the housing 102, the fire will ignite the fuse 504, which will burn until it releases the fire suppression fluid inside the housing 102, thereby suppressing the fire. In FIG. 6, the fuse 504 is disposed outside the housing 102.

Figure 7:
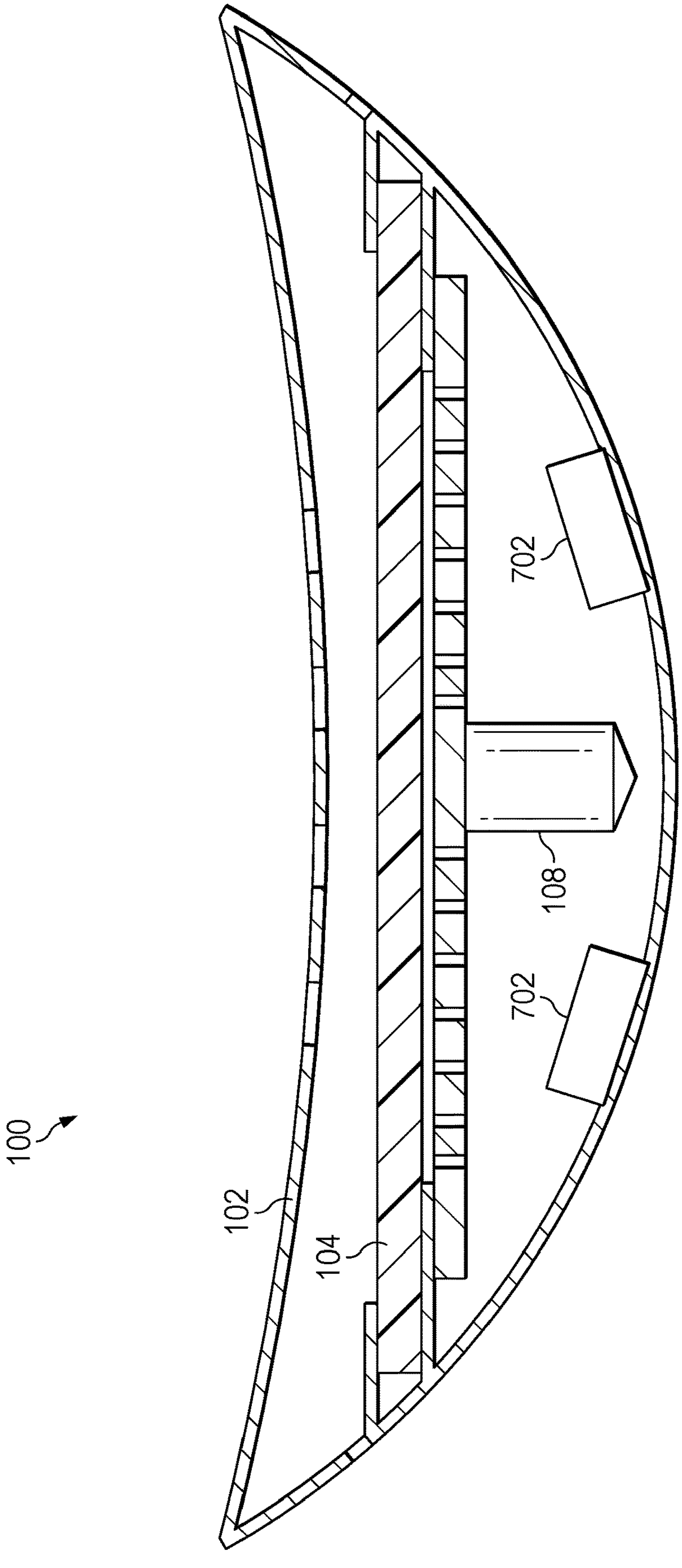
FIG. 7 illustrates the system of FIG. 1 with still other fire suppression packs according to this disclosure.

FIG. 7 illustrates the system 100 with still other fire suppression packs according to this disclosure. As shown in FIG. 5, the housing 102 includes two fire suppression packs 702 disposed at the bottom inner surface of the housing 102, such as in or near the pool area 120. In this embodiment, the fire suppression packs 702 comprise a neutralizing fluid surrounded by a sealed membrane, similar to the structure of a dishwasher detergent pod. When the membrane becomes wet or warm, the membrane dissolves, thereby releasing the neutralizing fluid into the pool area 120, where the neutralizing fluid can neutralize any flammable liquid present in the pool area 120. The neutralizing discourages or prevents the flammable liquid from igniting.

Figure 8:
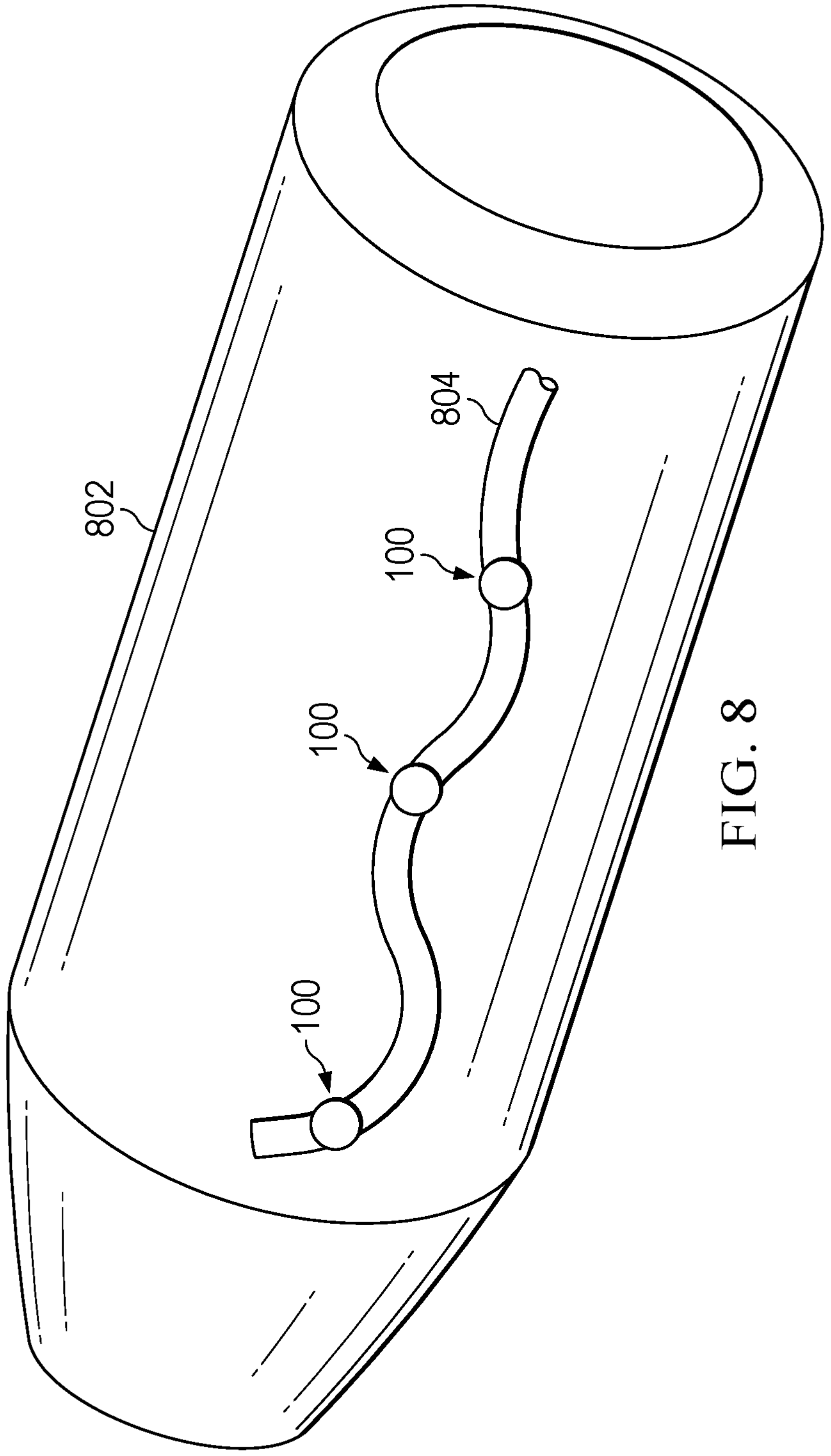
FIGS. 8 through 10 illustrate various mounting options for the system of FIG. 1 according to this disclosure.
Figure 9:
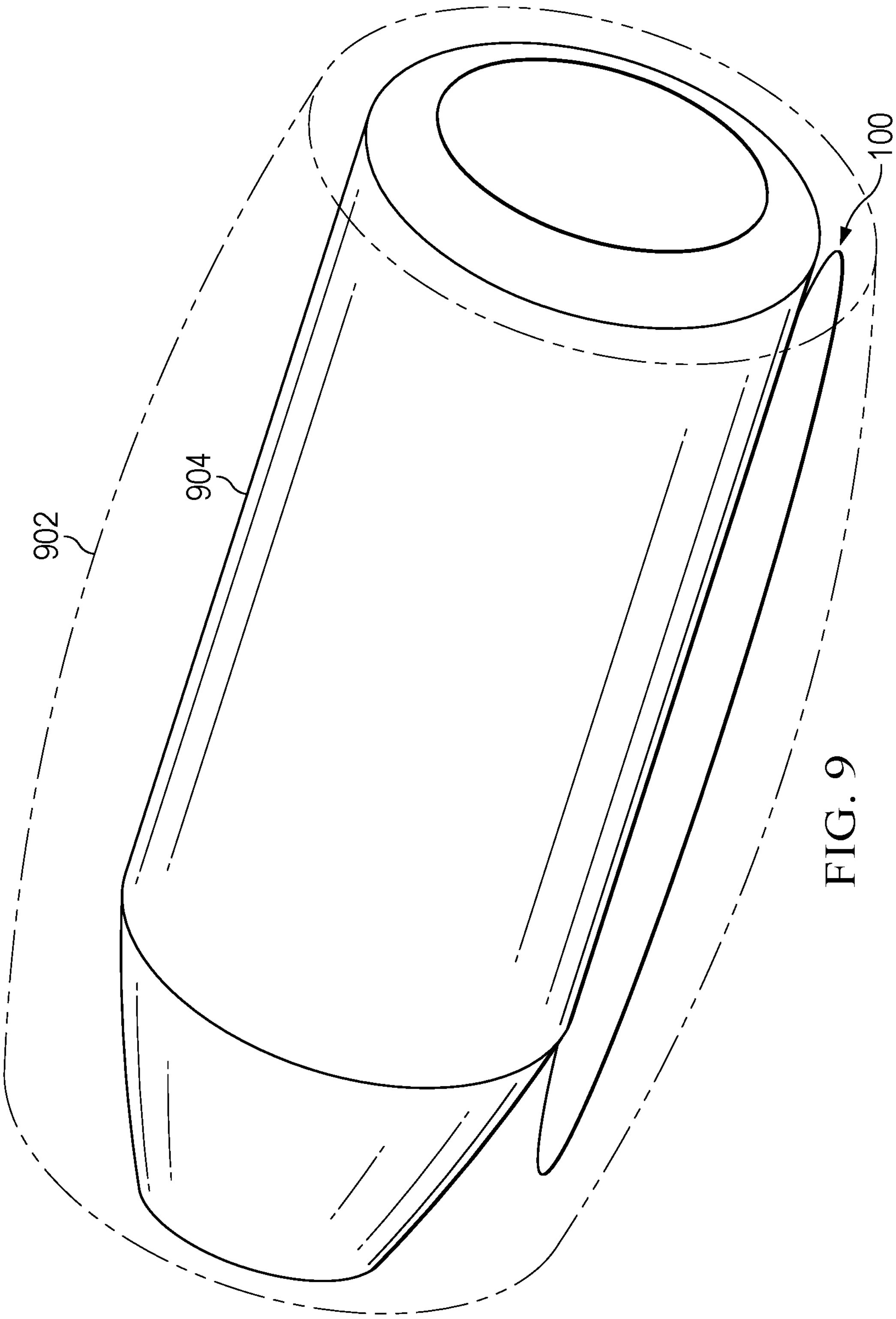
Figure 10:
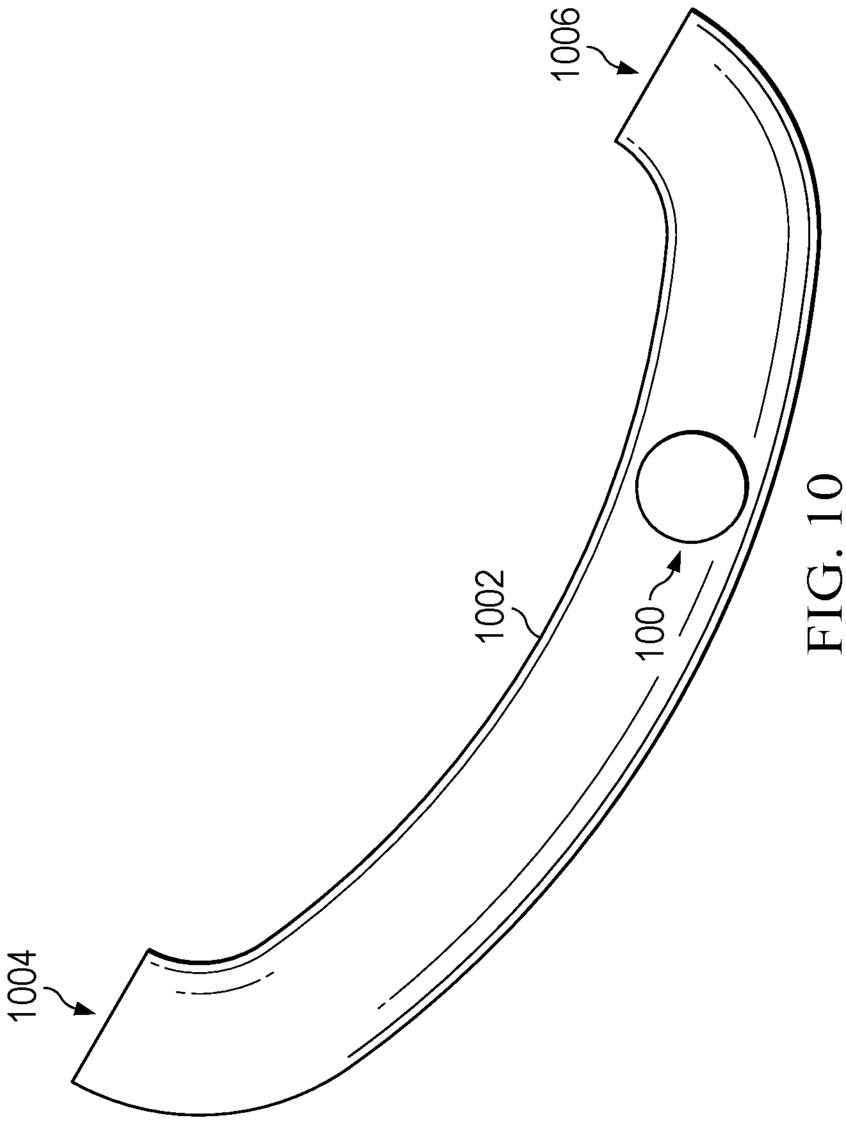

FIGS. 8 through 10 illustrates various mounting options for the system 100 according to this disclosure. As shown in FIG. 8, the system 100 could be self-contained and mountable on the side of an aircraft engine 802. In some embodiments, multiple units of the system 100 could be installed on or adjacent to an oil or fuel line 804 that forms part of the engine 802. As shown in FIG. 9, the system 100 could be installed along a bottom portion of a nacelle 902 that surrounds an aircraft engine 904. Here also, one or multiple units of the system 100 could be included within the nacelle 902. As shown in FIG. 10, the system 100 could be installed within or adjacent to a cabin air duct 1002 of an aircraft nacelle between the cabin 1004 and the gearbox 1006.

Although FIGS. 1 through 10 illustrate examples of a fuel and oil leak detection system 100 and related details, various changes may be made to FIGS. 1 through 10. For example, the housing 102 could be formed in various shapes different from those shown in the figures. Also, the membrane 104 could be made of one or more materials other than polystyrene or polypropylene. In some embodiments, a fire suppression system such as shown in FIGS. 4 through 7 could be activated by the pilot of the aircraft. In addition, various components in the system 100 may be combined, further subdivided, replicated, rearranged, or omitted and additional components may be added according to particular needs.

As described above, the disclosed embodiments provide multiple advantageous benefits over conventional leak detection systems, including increased speed in detecting leaks and potentially preventing in-flight shutdowns (IFSDs). Other conventional sensing systems may have difficulty differentiating between oil, fuel and water. The disclosed membrane ensures that only petroleum based liquids make it through to the sensor area. This allows for the selection of a relatively simple, low-cost sensor that only needs to screen for a pool of liquid. Additionally, the option of powering the system with a Peltier plate can allows the system to have a long operational life without needing to be recharged, thereby reducing maintenance.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
- a housing;
- a membrane disposed within the housing and configured to separate the housing into a lower area and an upper area, the membrane formed of a material that dissolves when exposed to a flammable liquid; and
- at least one sensor disposed within the lower area of the housing, the sensor configured to detect a presence of a liquid collected in a pool area corresponding to a bottom surface inside the housing,
- wherein the housing includes one or more side walls having one or more exit holes provided to allow non-flammable liquid that, during operation, has entered the housing via one or more input holes and accumulated on the membrane to exit the housing.

2. The system of claim 1, wherein the material comprises polystyrene or polypropylene.

3. The system of claim 1, wherein the housing includes an upper wall that includes the one or more input holes, the one or more input holes passing through the upper wall and positioned above the membrane.

4. The system of claim 1, further comprising a bracket disposed within the housing and configured to hold the sensor in a fixed position within the lower area of the housing.

5. The system of claim 1, wherein the sensor is installed at a location such that a space of a predetermined size exists between a liquid sensing element of the sensor and the bottom surface inside the housing.

6. The system of claim 1, further comprising:

a Peltier plate disposed within the housing and configured to power the sensor.

7. The system of claim 1, further comprising:

a wired or wireless transmitter coupled to the sensor and configured to enable communication between the sensor and another device.

8. The system of claim 1, further comprising:

at least one fire suppression pack disposed within the housing.

9. A system comprising:

an aircraft engine; and one or more leak detection systems disposed on, in, or adjacent to the aircraft engine, each of the one or more leak detection systems comprising:

a housing;

a membrane disposed within the housing and configured to separate the housing into a lower area and an upper area, the membrane formed of a material that dissolves when exposed to a flammable liquid; and at least one sensor disposed within the lower area of the housing, the sensor configured to detect a presence of a liquid collected in a pool area corresponding to a bottom surface inside the housing, wherein the housing includes one or more side walls having one or more exit holes provided to allow non-flammable liquid that, during operation, has entered the housing via one or more input holes and accumulated on the membrane to exit the housing.

10. The system of claim 9, wherein the material comprises polystyrene or polypropylene.

11. The system of claim 9, wherein the housing includes an upper wall that includes the one or more input holes, the one or more input holes passing through the upper wall and positioned above the membrane.

12. The system of claim 9, further comprising a bracket disposed within the housing and configured to hold the sensor in a fixed position within the lower area of the housing.

13. The system of claim 9, wherein the sensor is installed at a location such that a space of a predetermined size exists between a liquid sensing element of the sensor and the bottom surface inside the housing.

14. The system of claim 9, further comprising:

a Peltier plate disposed within the housing and configured to power the sensor.

15. The system of claim 9, further comprising:

a wired or wireless transmitter coupled to the sensor and configured to enable communication between the sensor and another device.

16. The system of claim 9, further comprising:

at least one fire suppression pack disposed within the housing.

17. The system of claim 9, wherein the aircraft engine and the one or more leak detection systems are disposed within a nacelle.

18. The system of claim 9, wherein the one or more leak detection systems are installed on or adjacent to an oil or fuel line that forms part of the aircraft engine.

* * * * *